No. 796,007. PATENTED AUG. 1, 1905.
J. E. PACKARD.
STAND FOR VENDING MACHINES.
APPLICATION FILED DEC. 9, 1904.
2 SHEETS—SHEET 1.
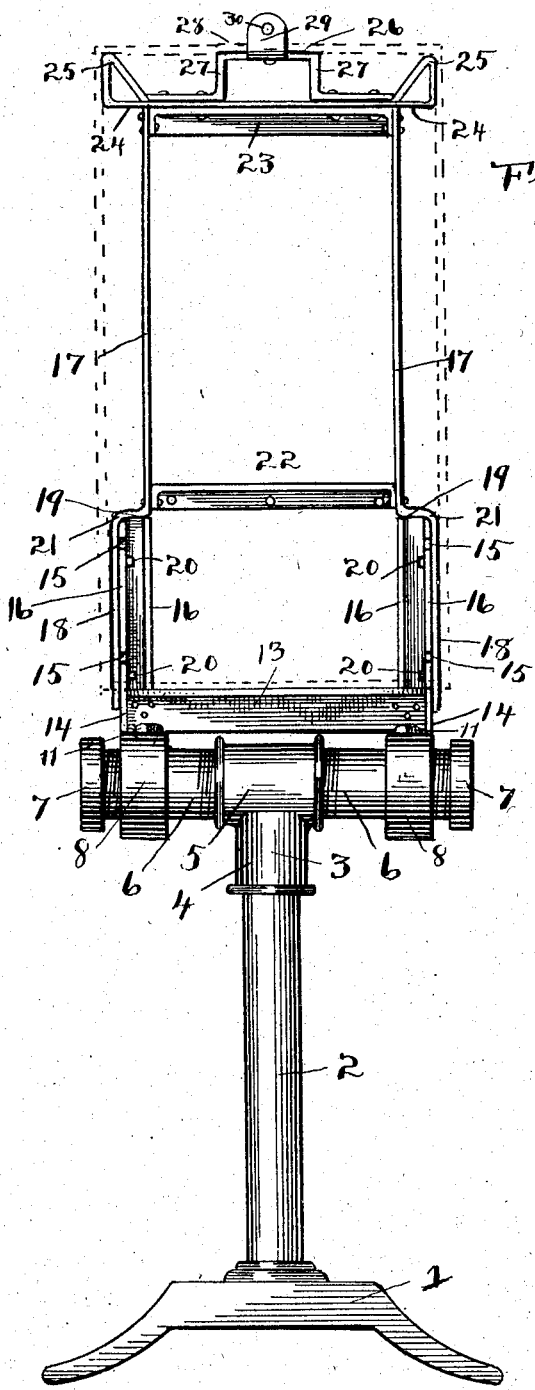
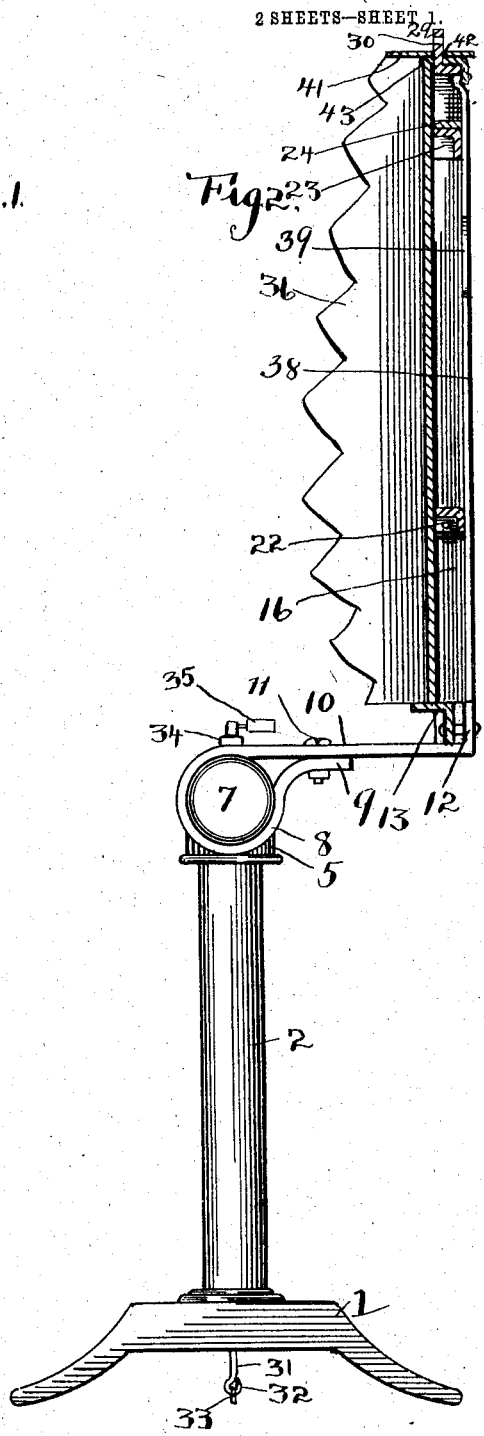
Witnesses:
William P. Bond
Pirsson H. Banning
Inventor
John E. Packard
By Banning & Banning
Attys.

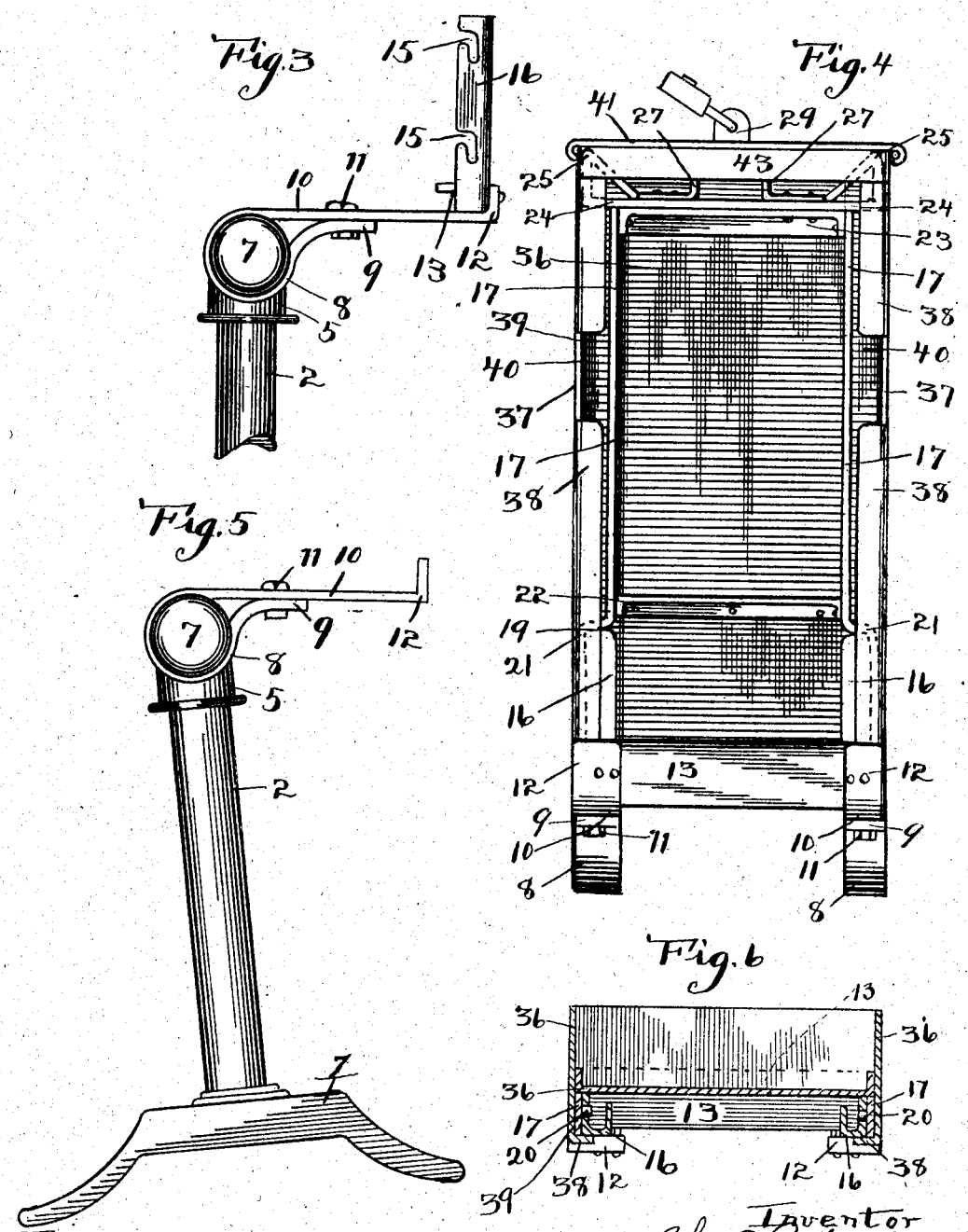

UNITED STATES PATENT OFFICE.

JOHN E. PACKARD, OF CHICAGO, ILLINOIS, ASSIGNOR TO MULTI-VENDING COMPANY, OF PIERRE, SOUTH DAKOTA, A CORPORATION OF SOUTH DAKOTA.

STAND FOR VENDING-MACHINES.

No. 796,007.　　　　Specification of Letters Patent.　　　　Patented Aug. 1, 1905.

Application filed December 9, 1904. Serial No. 236,149.

*To all whom it may concern:*

Be it known that I, JOHN E. PACKARD, a citizen of the United States, residing at Chicago, in the county of Cook and State of Illinois, have invented certain new and useful Improvements in Stands for Vending-Machines, &c., of which the following is a specification.

The stand of the present invention is intended for use more especially with vending-machines, although it may be employed as a support for other devices or structures; and the object of the invention is to produce a stand which shall be strong and rigid and adapted to be positioned upon a level support or surface or upon a support or surface having different degrees of inclination. In use with vending-machines it is often necessary to position the machine upon a sloping sidewalk or other sloping surface, and it is highly desirable that under such circumstances the vending-machine itself maintain a vertical position, and the stand or support is adjustable to vertically support the vending-machine at all times.

Another object of the invention is to combine simplicity of construction with ease of adjustment and a high degree of rigidity and strength.

A final object of the invention is to provide means for securing and locking the vending or other machine to the stand by the provision of a bracket, which is intended to be used in combination with the support or stand by so arranging the parts that the position of the vending-machine will serve to lock and maintain the parts rigidly together.

The invention consists in the features of construction and combination of parts hereinafter described and claimed.

In the drawings illustrating the invention, Figure 1 is a front view of the stand or bracket; Fig. 2, a side view of the same, showing the rear wall of the vending-machine sectioned; Fig. 3, a detail of the upper part of the stand and attached parts; Fig. 4, a rear view of a vending-machine as positioned on the bracket; Fig. 5, a side elevation showing the stand in tilted position on a sloping surface, and Fig. 6 a cross-section of the casing.

The stand or support consists of a base 1 of suitable size and shape, from the center of which projects an upright 2, preferably of tubular construction, and at the upper end of the upright is a T-coupling 3, having an upright tubular section 4 and a cross tubular section 5, into the opposite ends of which are screw-threaded cross-arms 6, preferably formed of sections of pipe closed at their ends by means of plugs 7, which are screwed onto the cross-arms in the usual manner. Surrounding the cross-arms and on opposite sides of the upright and T-coupling are two straps 8, each having a short arm 9 and a projected upper or supporting arm 10, which arms are secured together by means of bolts 11, which clamp together the arms of the straps and clamp the same firmly and tightly onto the cross-arm to allow the parts to be adjusted to maintain a horizontal position for the upper or supporting arm regardless of the degree of inclination of the upright, so that the vending or other machine supported by the supporting-arms will maintain a vertical position at all times. The supporting-arms terminate in outwardly-projecting end flanges 12, to which is secured a platform 13, of angle-plate, one of the flanges of which serves as a support for the bottom of the vending-machine. Secured to the ends of the platform and supporting-arms are upright bracket-plates 14, formed of angle-plate and provided with bayonet-catch slots 15 in their forwardly-projecting flanges 16, as shown in Fig. 3, which arrangement provides a firm and rigid attachment for the bracket hereinafter described.

The bracket consists of side arms 17, terminating in outwardly-projected ends 18, forming oppositely-disposed shoulders 19. The outwardly-projected ends are properly spaced to straddle the upright attaching-plates 14 and are provided with inwardly-extending studs or pins 20, which are adapted to be inserted into the bayonet-catch slots and to be dropped down thereinto to hold the bracket in position upon the angular upright supporting bars or plates. When dropped into position, the shoulders 19 will abut against the upper ends 21 of the upright supports, which serve as a firm rigid base for the bracket. The bracket is provided with a flanged lower cross-rail 22 and a similar upper rail 23, which cross-rails reinforce and properly space the side rails or bars of the bracket. The top of the bracket is completed by means of a bar 24, which outwardly projects beyond the sides of the cross-rail 23 and terminates in upwardly-projecting side supports 25, between which is secured a middle support 26, having sides 27 and a top or supporting bar 28, to the under face of which is secured an upwardly-projecting locking-tongue 29, which is provided with a hole 30 for the purpose of passing a padlock of other suitable locking mechanism therethrough.

If it is desirable to lock the stand to a sidewalk or other support, such locking can be easily accomplished by means of a rod 31, having on its end an eye 32, adapted to be secured by means of a hook 33, fastened to the sidewalk or other support, and said rod passes through the upright 2 and the T-coupling and has a nut 34 screw-threaded onto its upper end, and said nut may be locked on by means of a padlock 35 or other locking means, if so desired, thereby preventing removal of the nut and the displacement of the mechanism.

The stand or support of the present invention is intended more especially for use with vending-machines having a casing 36 of any suitable construction, and said casing is provided with rearwardly-projected flanges 37, the edges of which are inwardly bent or turned to form guide-flanges 38, leaving a channel 39, which is open at the bottom, and the wall of of the flange 38 is cut away at a suitable point to provide an opening 40 for a purpose to be hereinafter explained. The casing of the vending-machine is provided with a slidable cover 41, having therein a slot or opening 42 for the projection therethrough of the tongue 29, by which the parts are locked together. The cover is adapted when in closed position to abut against an angle-plate 43, which connects the two flanges 38 and serves to reinforce the top of the casing.

In use the supporting-arms are adjusted to project in horizontal position, and the bracket is secured to the upwardly-projecting bracket-plates 14 by inserting the inwardly-projecting studs or pins 20 into the bayonet-catch slot 15 and allowing the bracket to drop down and be supported by the bracket-plates to have the shoulders 19 abut against the upper ends of the bracket-plates, as shown in Fig. 1. The vending-machine is then secured to the bracket and bracket-plates by raising it into a position to allow the upper end supports 25 to be passed through the openings 39, after which the vending-machine is dropped down into place until it rests upon the shelf or platform 13, in which position the locking-tongue 29 will be projected through the plate 43 and cover 41, as shown in Fig. 4. When in this position, the parts may be locked by means of a padlock, which prevents the removal of the vending-machine and likewise prevents the removal of the bracket from the bracket-supporting plates, which removal can only be accomplished by raising the studs 20 out of the bayonet-catch slots, which raising will be prevented by the padlock. A further safeguard against the removal of the bracket from the bracket-plates is afforded by the provision of the flange 38, which inclosed the outwardly-projecting ends 18 of the side rails 17 of the bracket and prevents the unlocking of the bayonet-catch.

It will be seen from the foregoing description that the arrangement is one which enables the entire device to be locked together with but a single padlock, which serves to lock the cover to the casing and lock the bracket to the bracket-plate, thereby preventing the removal of the vending-machine by unauthorized persons. At the same time when it is desirable to remove or replace a vending-machine it can be readily done by unlocking a single padlock, which permits the parts to be disassembled for the purpose of substituting another vending-machine or otherwise. The device is one which enables the vending-machine to be supported in any position, and the base or support can be employed with or without the bracket, since the latter is easily removable from or attachable to the support.

The cross-bar 43 on the rear of the vending-machine serves to enable the machine to be supported by the hand at this point and lowered down into position on the bracket without pinching the fingers or injuring the hand. This operation is rendered easy by the fact that the central support 26 on the top of the bracket is formed to leave an open space into which the hand or fingers can be inserted.

The device as a whole enables vending-machines to be used in places and under conditions which would militate against the use of stands or brackets of ordinary construction, thereby greatly increasing the field of usefulness of the vending-machine.

What I regard as new, and desire to secure by Letters Patent, is—

1. In a support for vending-machines, &c., the combination of a base, an upright secured to the base, a cross-arm secured to the upright, supporting-arms projecting at right angles to the cross-arm, and means for adjusting the supporting-arms in angular relation to the upright, substantially as described.

2. In a support for vending-machines, &c., the combination of a base, an upright secured to the base, a cross-arm secured to the upright, supporting-arms projecting at right angles to the cross-arm, means for adjusting the supporting-arms in angular relation to the upright, and a bracket removably secured to the supporting-arms, substantially as described.

3. In a support for vending-machines, &c., the combination of a base, an upright secured thereto, a cross-arm secured to the upright, and supporting-arms terminating at their attaching ends in straps surrounding the cross-arm and adjustable with respect thereto, substantially as described.

4. In a support for vending-machines, &c., the combination of a base, an upright secured thereto, a cross-arm secured to the upright, supporting-arms terminating at their attaching ends in straps surrounding the cross-arm and adjustable with respect thereto, and a bracket removably secured to the supporting-arms, substantially as described.

5. In a support for vending-machines, &c., the combination of a base, an upright secured thereto, a cross-arm secured to the upright, a supporting-arm terminating at its attaching end in a strap encircling the cross-arm, a bolt for securing the free end of the strap to the supporting-arm for clamping the supporting-arm to the cross-arm and allowing it to be adjusted with respect thereto, substantially as described.

6. In a support for vending-machines, &c., the combination of a base, an upright secured thereto, a cross-arm secured to the upright, a supporting-arm terminating at its attaching end in a strap encircling the cross-arm, a bolt for securing the free end of the strap to the supporting-arm for clamping the supporting-arm to the cross-arm and allowing it to be adjusted with respect thereto, and a bracket removably secured to the supporting-arm, substantially as described.

7. In a support for vending-machines, &c., the combination of a base, an upright secured to the base, a T-coupling screw-threaded onto the upright, a cross-arm screw-threaded into the coupling in transverse relation to the upright, rearwardly-projecting supporting-arms secured to the cross-arm on opposite sides of the coupling and adjustable with respect to the cross-arm, upwardly-projecting flanges on the ends of the supporting-arms, bracket-plates secured to the flanges of the supporting-arms and provided with bayonet-catch slots, and a bracket provided with bayonet-catch pins adapted to be inserted into the slots, substantially as described.

8. In a support for vending-machines, &c., the combination of a base, an upright secured to the base, a T-coupling screw-threaded onto the upright, a cross-arm screw-threaded into the coupling in transverse relation to the upright, rearwardly-projecting supporting-arms secured to the cross-arm on opposite sides of the coupling and adjustable with respect to the cross-arm, upwardly-projecting flanges on the ends of the supporting-arms, bracket-plates secured to the flanges of the supporting-arms and provided with bayonet-catch slots, a bracket provided with bayonet-catch pins adapted to be inserted into the slots, and a casing for a vending-machine provided with guideways adapted to slide down over and inclose the bayonet-catch to inclose the parts after the bracket has been secured to the bracket-plates, substantially as described.

9. In a support for vending-machines, &c., the combination of a cross-arm, supporting-arms terminating in straps encircling the cross-arm and adjustable with respect thereto, bracket-supporting plates upwardly-extending from the supporting-arms, a shelf forwardly projecting between the bracket-supporting plates, and a bracket removably secured to the bracket-supporting plates by means of a bayonet-catch, substantially as described.

JOHN E. PACKARD.

Witnesses:
WALKER BANNING,
T. A. BANNING, Jr.